(12) United States Patent
Tourneur (10) Patent No.: US 11,320,962 B2
(45) Date of Patent: May 3, 2022

(54) METHOD FOR HANDLING ON A MOBILE TERMINAL A LIST OF CONTENTS EACH ASSOCIATED TO A SUB-CONTENT

(71) Applicant: ORANGE, Issy-les-Moulineaux (FR)

(72) Inventor: Michael Tourneur, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/632,737

(22) PCT Filed: Jul. 13, 2018

(86) PCT No.: PCT/IB2018/000986
§ 371 (c)(1),
(2) Date: Jan. 21, 2020

(87) PCT Pub. No.: WO2019/016612
PCT Pub. Date: Jan. 24, 2019

(65) Prior Publication Data
US 2020/0167044 A1 May 28, 2020

(30) Foreign Application Priority Data

Jul. 21, 2017 (WO) ................ PCT/CN2017/093880

(51) Int. Cl.
*G06F 3/0482* (2013.01)
*G06F 3/04883* (2022.01)
(Continued)

(52) U.S. Cl.
CPC ........ *G06F 3/0482* (2013.01); *G06F 3/04812* (2013.01); *G06F 3/04883* (2013.01); *G06Q 10/02* (2013.01)

(58) Field of Classification Search
CPC .. G06F 3/04812; G06F 3/0482; G06F 3/0484; G06F 3/0488; G06F 3/04883;
(Continued)

(56) References Cited

U.S. PATENT DOCUMENTS 6,181,344 B1 * 1/2001 Tarpenning ........... G06F 1/1632
715/863
6,356,287 B1 * 3/2002 Ruberry ................ G06F 1/1656
715/864
(Continued)

FOREIGN PATENT DOCUMENTS

CN 102428429 A 4/2012
CN 103257795 A 8/2013
(Continued)

OTHER PUBLICATIONS

International Search Report dated Nov. 20, 2018 for corresponding International Application No. PCT/IB2018/000986, filed Jul. 13, 2018.
(Continued)

*Primary Examiner* — Steven P Sax
(74) *Attorney, Agent, or Firm* — David D. Brush; Westman, Champlin & Koehler, P.A.

(57) ABSTRACT

A method for handling on a mobile terminal a list of contents each associated to a sub-content, the list of contents and each sub-content being displayable on a touch-sensitive screen of the terminal. The method includes performing by a processing unit of the terminal: displaying on the screen a window containing the sub-content associated to a first content selected by a user from said list of contents; detecting a predetermined touch gesture by the user on the screen; and when a predetermined touch gesture has been detected, displaying on the screen, over the displayed window, a pop-up window containing a sub-list of contents from said list of contents.

11 Claims, 4 Drawing Sheets

(51) Int. Cl.
*G06F 3/04812* (2022.01)
*G06Q 10/02* (2012.01)

(58) Field of Classification Search
CPC . G06F 8/30; G06F 9/44; H04L 67/148; H04L 29/06
See application file for complete search history.

(56) References Cited

U.S. PATENT DOCUMENTS

| | | | |
|---|---|---|---|
| 8,412,278 B2 | 4/2013 | Shin et al. | |
| 9,690,441 B2* | 6/2017 | Kim | G06Q 10/107 |
| 9,733,784 B1* | 8/2017 | King | G06F 40/106 |
| 9,841,878 B1* | 12/2017 | Morris | G06F 3/04845 |
| 10,990,757 B2* | 4/2021 | Ramarao | G06F 40/274 |
| 2005/0169527 A1* | 8/2005 | Longe | G06F 3/04886 382/177 |
| 2006/0248051 A1* | 11/2006 | Meyers | G06F 16/9577 |
| 2007/0139386 A1* | 6/2007 | Martin | G06F 3/04886 345/173 |
| 2008/0097972 A1* | 4/2008 | Gordon | G06F 16/951 |
| 2010/0198841 A1* | 8/2010 | Parker | G06F 16/951 707/750 |
| 2011/0107255 A1 | 5/2011 | Kim | |
| 2011/0157046 A1 | 6/2011 | Lee et al. | |
| 2011/0161091 A1* | 6/2011 | Freishtat | G06Q 30/02 705/1.1 |
| 2011/0213655 A1* | 9/2011 | Henkin | G06Q 30/0251 705/14.49 |
| 2011/0225539 A1* | 9/2011 | Lee | G06F 3/0482 715/784 |
| 2012/0124630 A1* | 5/2012 | Wellen | H04N 21/8133 725/109 |
| 2012/0293605 A1* | 11/2012 | Seferian | H04L 65/607 348/14.08 |
| 2013/0036439 A1* | 2/2013 | Kim | H04N 21/26283 725/40 |
| 2013/0132908 A1* | 5/2013 | Lee | G06F 3/04842 715/838 |
| 2013/0318437 A1 | 11/2013 | Jung et al. | |
| 2013/0321285 A1* | 12/2013 | Hoyer | G06F 3/0488 345/173 |
| 2014/0035846 A1* | 2/2014 | Lee | G06F 3/04886 345/173 |
| 2014/0047413 A1* | 2/2014 | Sheive | G06F 8/30 717/110 |
| 2014/0109004 A1* | 4/2014 | Sadhvani | G06F 3/04842 715/810 |
| 2014/0245335 A1* | 8/2014 | Holden | H04N 21/44218 725/12 |
| 2014/0310649 A1* | 10/2014 | Bernstein | G06F 40/18 715/808 |
| 2015/0293926 A1* | 10/2015 | Yang | H04W 4/029 707/610 |
| 2016/0026609 A1* | 1/2016 | Adams | G06F 40/103 715/205 |
| 2016/0110321 A1* | 4/2016 | Kalisz | H04L 67/125 715/205 |
| 2016/0180259 A1* | 6/2016 | Marianko | H04L 51/043 705/5 |
| 2017/0187811 A1* | 6/2017 | Thomee | H04L 65/4069 |
| 2019/0012059 A1* | 1/2019 | Kwon | G06F 3/04842 |

FOREIGN PATENT DOCUMENTS

| | | |
|---|---|---|
| CN | 103425245 A | 12/2013 |
| CN | 106445956 A | 5/2017 |
| EP | 2687964 A1 | 1/2014 |
| WO | 2013169846 A1 | 11/2013 |

OTHER PUBLICATIONS

Written Opinion of the International Searching Authority dated Nov. 20, 2018 for corresponding International Application No. PCT/IB2018/000986, filed Jul. 13, 2018.
International Search Report dated Jan. 24, 2018 for corresponding International Application No. PCT/CN2017/093880, filed Jul. 21, 2017.
Written Opinion of the International Searching Authority dated Mar. 23, 2018 for corresponding International Application No. PCT/CN2017/093880, filed Jul. 21, 2017.

* cited by examiner

FIG. 1

2 030 662 advertisement

Sophie the Giraffe crib
Baby products
Plouézec/Côtes d'Armor
45€
Today, 4:22pm

"Daniel HECHTER" pink trousers
Clothes
Le Mesnil-Saint-Denis/ Yvelines
5€
Today, 4:22pm Building land
Real estate
Igornay/Saône-et-Loire
15 000€
Today, 4:22pm Massey Ferguson tractor
Toys
Saint-Pargoire/Hérault
10€
Today, 4:22pm 2010 DIESEL PUNTO GRANDE 106000 km
Cars
Vanclans/Doubs
2500€
Today, 4:22pm Phillips speaker for IPHONE 4
Image & Sound
Amiens/Somme
5€
Today, 4:22pm

METHOD FOR HANDLING ON A MOBILE TERMINAL A LIST OF CONTENTS EACH ASSOCIATED TO A SUB-CONTENT

CROSS-REFERENCE TO RELATED APPLICATIONS

This Application is a Section 371 National Stage Application of International Application No. PCT/IB2018/000986, filed Jul. 13, 2018, which is incorporated by reference in its entirety and published as WO 2019/016612 A1 on Jan. 24, 2019, not in English.

FIELD OF THE INVENTION

The field of this invention is that of mobile terminals.

More particularly, the invention relates to a method for handling on a mobile terminal a list of contents each associated to a sub-content.

BACKGROUND OF THE INVENTION

Most of mobile applications are designed to provide the user with a list of contents as possible results in response to a query of various types (a search using keywords, a request for possibilities, etc.). For instance, the contents may be e-mails of the user, nearby restaurants, second-hands goods, products of a brand, apartments to rent, geographical locations available for weather forecasting, vacant jobs, etc.

Figure 1:
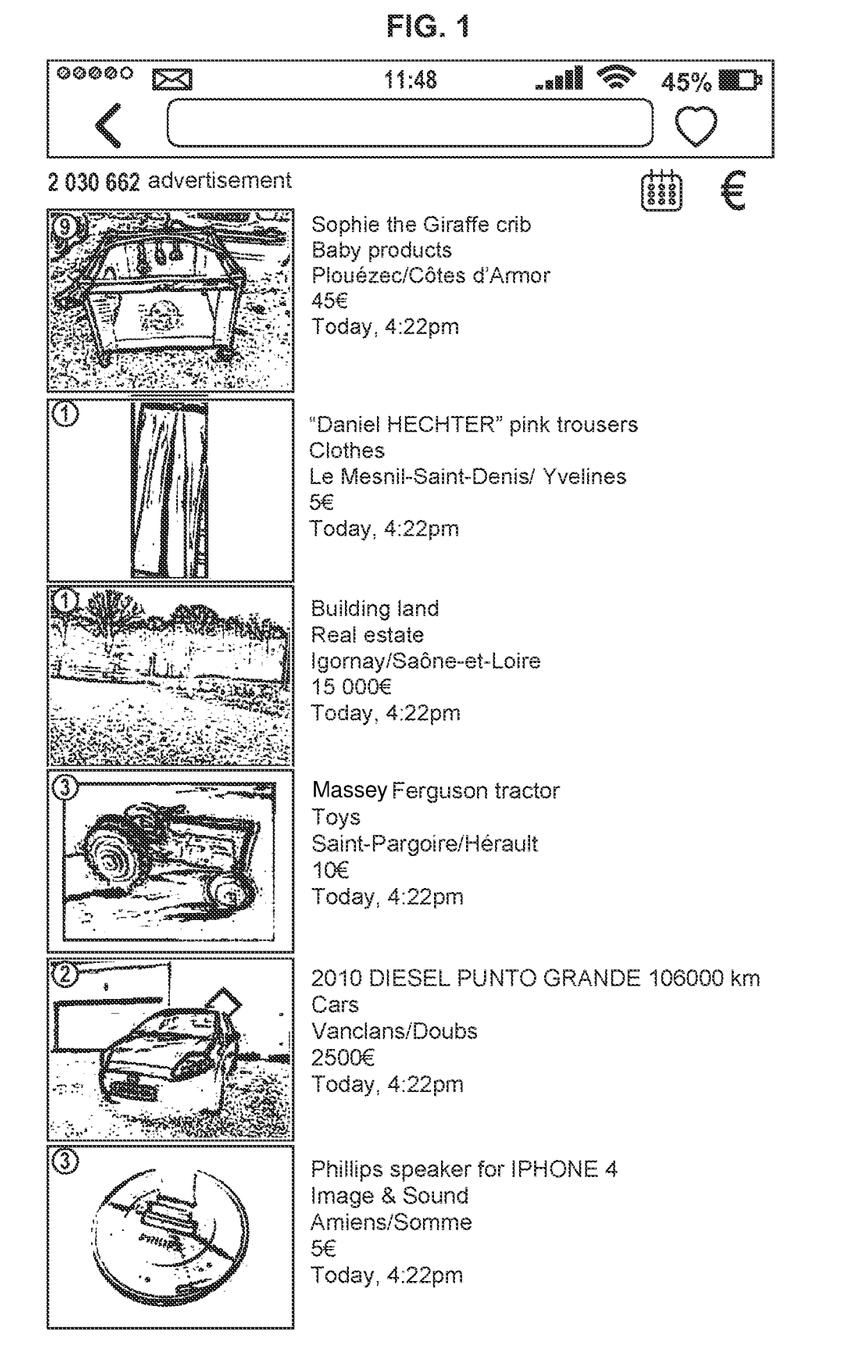
FIG. 1, already discussed, represents an example of a result page displayed in a window.

As depicted by FIG. 1 (example from "Le Bon Coin" application), the different contents are displayed as a list of rows in a result page, each row being selectable and redirecting to a corresponding sub-content to be displayed (generally a more detailed page about the content).

Thus, when the user selects a row corresponding to a first content, it generates and displays a new window containing in full the detailed page about this first content. If the user wants to check a content of another row, he has to press a "back" button to revert to the previous window of the result page displaying the list of rows and then select the other row to see the associated sub content in a new window, etc. Such re-selection process is not user-friendly, as it needs back and forth operations/clicks in order to check different contents. Moreover, it requires the application to close and rebuild a window each time the user wants to see another content, which is resource consuming.

Alternatively to having distinct windows, some applications propose simultaneously displaying the list of result contents on a part of the window (for instance the left half), and the sub-content associated to a selected content on another part of the window (for instance the right half). In other words, the window contains both the list of contents and the sub-content associated to one of the contents. At each time a new content is selected, only the right part is updated. In that case, there is no need for back and forth operations, and the same window can be kept open, but due to the small size of mobile terminal, the information displayable by each area is very limited, and such arrangement of the interface is not comfortable for the user.

If the application is a web browser, some operating systems allow multiple "tabs" corresponding to different windows. While only a single tab is displayable at once by the mobile terminal, other tabs can remain in the background (with windows already built but not displayed), and the user may switch from a tab to another to change the window currently displayed. Therefore, it is possible to open tabs for one of more sub contents while keeping the window of the result page in a first tab. However, such solution requires keeping open a tab for the result page, which consumes resources. Besides, while it avoids the need for back and forth operations as described previously, such a solution still requires pressing a button for displaying a "tab selection" window, and then selecting another tab, which is not more user-friendly.

There is therefore a need for addressing these issues and proposing a way of displaying a list of contents and their associated sub-contents which is efficient both in terms of hardware resource consumption and for the user.

SUMMARY OF THE INVENTION

For these purposes, the present invention provides a method for handling on a mobile terminal a list of contents each associated to a sub-content, the list of content and each sub-content being displayable on a touch-sensitive screen of the mobile terminal, the method comprising:
  displaying (a) on the screen a window containing the sub-content associated to a first content selected by a user from said list of contents;
  detecting (b) a predetermined touch gesture by the user on the screen; and
  when a predetermined touch gesture has been detected, displaying (c) on the screen, over the displayed window, a pop-up window containing a sub-list of contents from said list of contents.

As it will be shown, thanks to the pop-up there is no more need for reverting to the window containing the list of contents (the result page): a direct switch from a sub-content to another is possible, without having to a build a new window. Furthermore, this pop-up can be opened and used in a one-gesture operation thanks to the alternate touch.

Preferred but non limiting features of the present invention are as follow:

the method further comprises:
  detecting (d) a selection by the user of a second content from the displayed sub-list of contents; and
  replacing (e), in the displayed window, the sub-content associated with the first content with a sub-content associated with the selected second content;
the window comprises a layout and at least one container element adapted to contain a sub-content, and wherein, during the replacing step, the layout is kept unmodified while the sub-content associated with the second content replaces the sub-content associated with the first content in the container element;
a graphic user interface is displayed on the screen, said graphic user interface comprising a back button for reverting to a previously displayed window when touched by the user according to a first touch gesture, the predetermined touch gesture being a second touch gesture, distinct from the first touch gesture, on said back button;
said predetermined touch gesture is a touch gesture among a swipe down touch gesture, a long duration touch gesture, and a high force touch gesture;
said second content is selected from said sub-list of the list of contents at step (b) by releasing the touch of the screen;
said sub-list of said list of contents does not comprise the first content;
said sub-list of said list of contents does not comprise any content already selected;
step (b) comprises analyzing the first content so as to search for a contextual parameter associated with the first content; said sub-list of the list of contents being function of the result of the search for a contextual parameter associated with the first content;

the method comprises previously displaying (a0) on the screen a window containing the list of contents for selection (b0) by the user;

the method further comprises:
  detecting a touch release action on the screen after the predetermined touch gesture; and
  when said touch release action occurs outside of the displayed pop-up window on the screen, closing the pop-up window.

In a second aspect, the invention provides a mobile terminal comprising a processing unit and a touch-sensitive screen, the processing unit being configured to:
  display on the screen a window containing the sub-content associated to a first content selected by a user from a list of contents each associated to a sub-content;
  detect a predetermined touch gesture by the user on the screen;
  when a predetermined touch gesture has been detected, display on the screen, over the displayed window, a pop-up window containing a sub-list of contents from said list of contents.

According to a third and a fourth aspects, the invention provides a computer program product, comprising code instructions for executing a method according to the first aspect for handling on a mobile terminal a list of contents each associated to a sub-content; and a computer-readable medium, on which is stored a computer program product comprising code instructions for executing a method according to the first aspect for handling on a mobile terminal a list of contents each associated to a sub-content.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF A PREFERRED EMBODIMENT

Architecture

Figure 2:
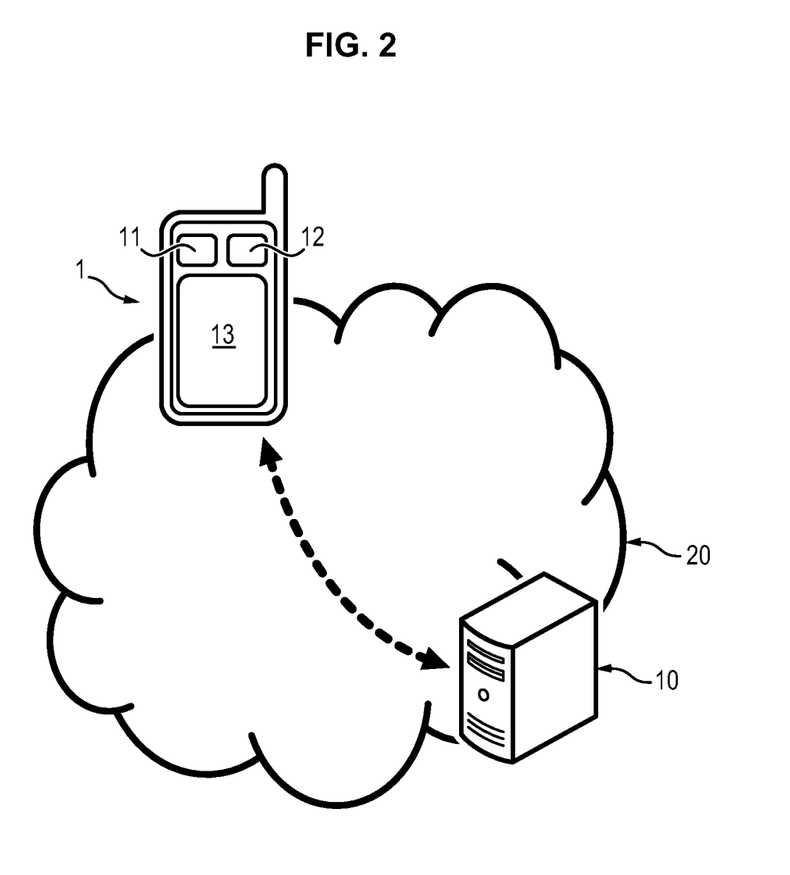
FIG. 2 illustrates an example of architecture in which the method according to the invention is performed.

The present invention relates to a method for operating a mobile terminal 1 as represented by FIG. 2. More precisely, the present method is for handling on the mobile terminal 1 a list of contents. Said list of contents is provided for instance as a result of a query.

The mobile terminal 1 is a device comprising a processing unit 11, i.e. a CPU (one or more processors), a memory 12 (for example flash memory), and a touch sensitive screen 13 for user interface. The memory 12 is in particular for storing applications, which can be of various types, and data. The terminal 1 also typically comprises a battery, in particular a rechargeable battery (for instance lithium polymer), for powering the processing unit 11 and other units.

The terminal 1 may further comprise other units such as a location unit for providing location data representative of the position of the terminal 1 (using for example GPS, network triangulation, etc.), a communication unit for connecting (in particular wirelessly) the terminal 1 to a network 20 (for example WiFi, Bluetooth, and preferably a mobile network, in particular a GSM/UMTS/LTE network, see below), etc.

Indeed, the terminal 1 is typically a smartphone, a tablet computer, a laptop, etc. In the following description the example of a smartphone will be used.

The network 20 may connect the terminal 1 to a server 10, for instance for providing the contents and sub-contents to the terminal 1 (an application installed on the terminal may simply transmit a query for contents to a server 10 and then receive the results from this server 10).

Back button

The present method is performed by the processing unit 11 of the terminal 1, and is implemented either by an application of the terminal 1 intended to handle lists of contents (a messaging application such as a SMS client or an e-mail client, a shopping application, etc.), a dedicated software application, or directly by the operating system.

As explained, each content of the list is associated to a sub-content, which is typically a more detailed version of the content (generally with images, a text, etc.).

The list of contents, the contents and the sub-contents associated to these contents are displayable on the touch-sensitive screen 13 of the mobile terminal 1 in windows. These windows are preferably covering most of the screen, i.e. full screen at the exception of minor interface areas (the interface generally presents panels with buttons at the top or the bottom of the screen 13), meaning that either the list of contents, or one of the sub-contents corresponding a content is displayed at once.

In other words, the windows are displayed within a graphic user interface provided with (at least) a command button. This button is preferably being touchable by the user according to a first touch gesture and a second touch gesture.

The first touch gesture is typically a "normal touch gesture", i.e. a simple touch gesture (brief, normal pressure and motionless touch gesture) for pressing the button, i.e. a click. The second touch gesture is typically an "alternate touch gesture" distinct from the first touch gesture, i.e. more than a simple touch gesture and in particular either a swipe touch gesture, especially a swipe down touch gesture (i.e. touching while moving the finger toward the bottom of the screen), a long duration touch gesture (with respect to the duration of a normal touch gesture, for instance more than two seconds), or a high force touch gesture (some touchscreens includes a "3D touch" technology allowing different pressure levels).

Figure 4:
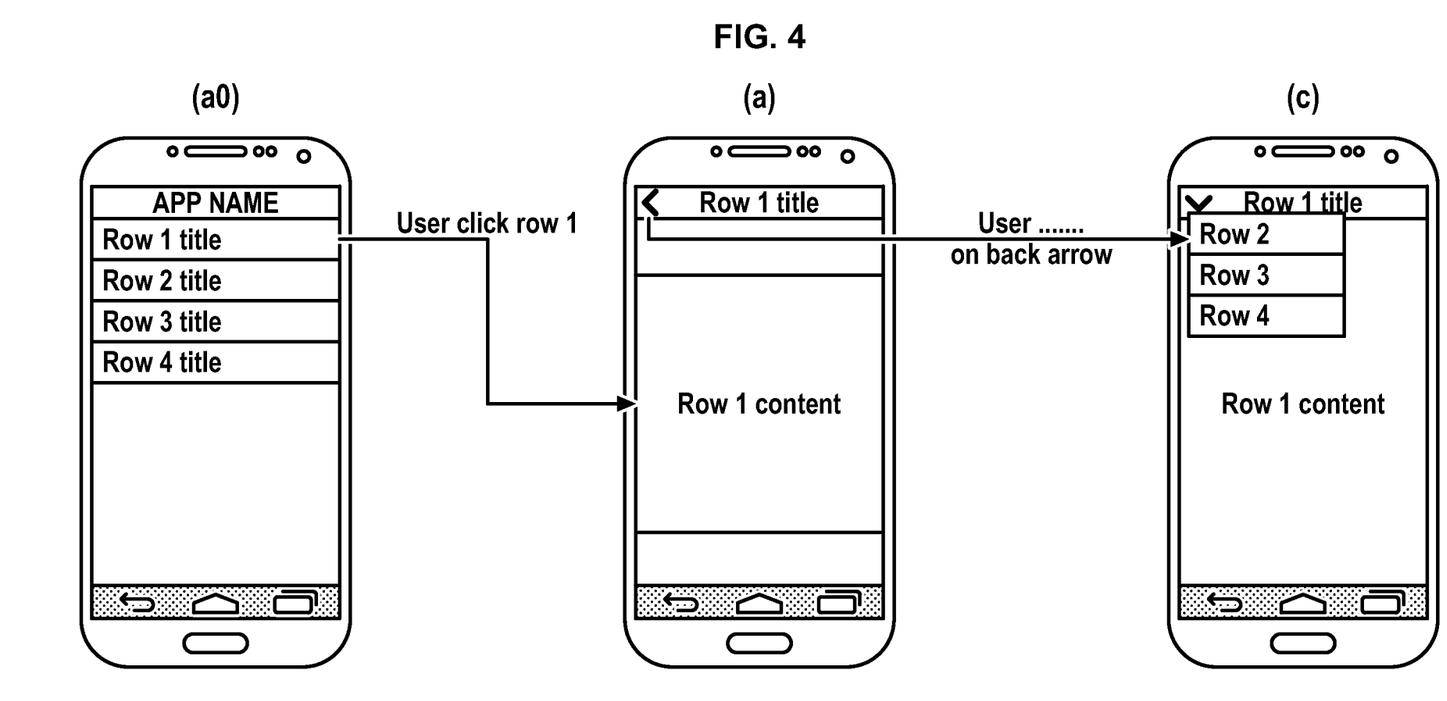
FIG. 4 represents examples of displays obtained when performing an embodiment of the method according to the invention.

Said command button is preferably a back button, generally located at the upper left of the screen, as illustrated by the example of display (a) in FIG. 4. The back button allows reverting to the previously displayed window when touched by the user according to the first touch gesture (the normal touch gesture).

It is to be noted that another command button may be used, but the back button is preferred as it is the button instinctively used by the user when he wants to change the displayed sub-content.

Method

Figure 3:
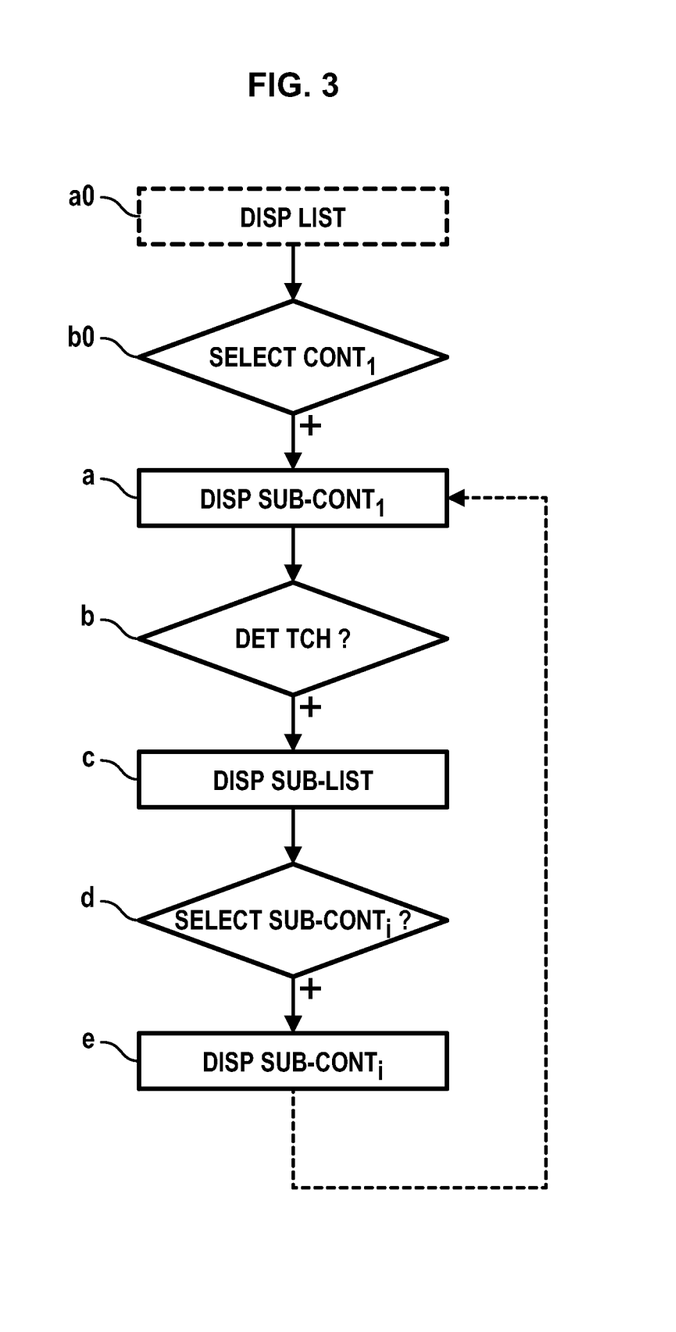
FIG. 3 illustrates an embodiment of a method for handling on a mobile terminal a list of contents each associated to a sub-content according to the present invention.

We refer now to FIG. 3 which illustrates an embodiment of the method according to the present invention.

This method can typically start when, after having displayed a window (referred to as "result window" for simplicity) containing the list of contents on the screen 13 (step a0, also illustrated by the example of display (a0) in FIG. 4), the user selects a first content $CONT_1$ by touching this first content on the screen 13 (step b0). However, other ways to select this first content can be contemplated without making a selection in a displayed list of contents.

After this user's selection, a new window (referred to as "detailed window" for simplicity) containing the sub-content $SUB-CONT_1$ associated to the first content $CONT_1$ selected by the user from said list of contents is displayed on the screen 13 (step a). This is illustrated by the example of display (a) in FIG. 4.

At this point, in the prior art, if the user wants to select another content so as to display on the screen 13 the sub-content associated to this other content, he has to trigger the display of the previously shown result window containing the full list of contents, typically by touching on screen 13 a dedicated button for that purpose, i.e. the "back" button according to a normal touch gesture, so as to revert to this previously shown result window and select on this window the other content.

To the contrary, in the present method, a predetermined touch gesture of the user is detected on the screen 13 (step b), such a predetermined touch being specifically designed for triggering the display of a sub-content list as explained afterwards rather than building back the previously displayed result window containing the list of contents.

Such a predetermined touch gesture can be defined by a predetermined touch location on the screen, e.g. at a command button of a graphic user interface (preferably the "back" button), and/or as a second touch gesture as described previously (preferably a swipe down gesture) on the graphic user interface, preferably a combination of the predetermined touch location on the screen (e.g. on the "back" button) and the second touch gesture (e.g. a swipe down gesture).

In other words, the predetermined touch gesture is detected when located on the predetermined location and/or done according to the second touch gesture. As explained, such a predetermined touch gesture is thus an alternate touch gesture when compared to a first touch gesture as previously described (i.e. a normal touch gesture) on the back button.

When such a predetermined touch gesture is detected by the mobile terminal, a sub-list of contents among the contents of the previously mentioned list is displayed (step c), to enable the selection by the user of another content CONT. This sub-list is displayed in a pop-up window, displayed over the current detailed window containing the first sub-content $CONT_1$, rather than by rebuilding a new window. This is illustrated by example of display (c) of FIG. 4.

In the particular case where the command button is the back button of the graphic user interface, e.g. located at the upper left of screen 13, the pop-up window appears just below the button, as illustrated in the example of display (a) of FIG. 4.

The sub-list is preferably limited to a few (for instance five) items of the original list of contents, so as to save screen space and enable direct switching from one detailed window to another (i.e. without back and forth operation through the result window).

Once the pop-up window containing the sub-list of contents is displayed, a selection by the user of a second content from this sub-list can be detected (step d).

The selection of the second content $CONT_i$ may be done with a one-gesture operation for a maximum user-friendliness: said second content is preferably selected from said sub-list of the list of contents at step (b) by releasing the touch of the screen 13 on the second content. Thus, in particular if the second touch gesture is a swipe down gesture, this movement brings the user finger above the pop-up window. He just has to lift the finger (i.e. release the touch) when reaching the content that he wants to select as second content. In other words, the user swipes down the pop-up window list, maintain the pressure while moving to the content to select, and release it. Other alternate touch gestures (long duration, etc.) also enable a one-gesture operation.

In a final step (e), similar to step (c), the sub-content $SUB-CONT_i$ associated to the second content $CONT_i$ selected the user from said sub-list of contents is displayed by the screen 13. Here, this is done by replacing, in the displayed detailed window containing the sub-content associated with the first content, this sub-content by the sub-content associated with the selected second content.

In other words, the detailed window (showing the sub-content) is kept open through the whole process (i.e. from step (a)), the sub-content associated with the first content being just replaced by the sub-content associated with the second content, thereby avoiding closing then rebuilding this detailed window (when closing the detailed window like it is the case in the prior art, more resources of the terminal 1 are requested in order to rebuild the layout of the window in parallel of loading content inside). Having the sub-list of contents displayed in the pop-up window allows using efficiently again the detailed window without changing its layout.

As the detailed window is kept open rather than closed, this detailed window is advantageously configured to contain containers which are configurable with image source, text, colors, etc. The detailed window may thus be updated by simply replacing what is in the containers already existing.

Steps (b) to (e) may then be repeated again, so as to explore a plurality of contents of the list (by selecting a third, a fourth, etc. content using the pop-up window). When the user is done, he can simply touch the command button according to a normal touch for reverting (if the button is the back button) to the initial result window containing the list of contents (for instance for modifying the query in order to get a new list of results).

In a specific embodiment, once the pop-up window containing the sub-list of contents is displayed, the user may wish to cancel this pop-up window without selecting a content in this pop-up window, for instance if there is undesired content displayed in this pop-up window.

In order to enable such a pop-up window cancellation, if a touch release action is detected on the touchscreen, after the detection of the predetermined touch gesture which triggered the display of the pop-up window, and if this touch release action occurs outside of the pop-up window on the screen, the pop-up window is closed.

For instance, the user may start to perform a swipe down touch gesture, and if he changes his mind, instead of releasing the touch at another content he releases the touch outside of the pop-up window, so as very easily to close this pop-up window and to revert to the already displayed window (containing the current sub-content).

Sub-List

As explained, the sub-list of contents is preferably limited to a few items for improving visibility and ergonomics. To this end, the initial list of contents may advantageously be filtered so as obtain the sub-list. If steps (b) to (e) are repeated, the sub-list may be filtered further into a new (and shorter) sub-list, etc.

Advantageously, thanks to such a filtering step, the sub-list of contents displayed in step (c) does not comprise the selected first content, whose sub-content is displayed in step (a). Therefore, should steps (b) to (e) be repeated, the sub-list of said list of contents advantageously does not comprise any content already selected. Thus, the user is only proposed contents for which he has not yet been shown the corresponding sub-content. This case is illustrated in example of display (c) of FIG. 4.

In a preferred embodiment, alternatively or in addition, the first content $CONT_1$ is analyzed so as to search for a contextual parameter associated with this first content. In that case, the sub-list of contents is built depending on this contextual parameter associated with the first content. In other words, the sub-list can be based on a similar current context, i.e. the context of the first content.

For example, if in the case shown in the example of display (a0) of FIG. 4, the content of the first row is related to a pen, whereas contents of the second, third and fourth rows are related to glasses, when user selects the second row, the sub-list will comprise contents of third and fourth rows, but neither the content of the first row, because it is not related to glasses, nor the content of the second row because it has already been selected.

Contextual parameters are "searched for", meaning that the processing unit 11 attempts at determining them, but they are not necessarily found, for instance if the text of the first content is very short and not meaningful. The analysis performed on the first content is typically a syntactical analysis on a text of the sub-content associated with the content (which is more detailed and thus "richer"). By syntactical analysis, it is meant recognition of given words, i.e. "syntactical items" of the text, having a meaning. Syntactical analysis is well known by the skilled person and can be perform simply by parsing the text of the sub-content into a sequence of syntactical items.

Terminal and Computer Program

The present invention concerns thus a mobile terminal 1 comprising a processing unit 11 and a touch-sensitive screen 13, for performing the method according to the first aspect. As already indicated, this terminal 1 may also comprise a memory 12.

The aforementioned processing unit 11 is in particular configured to implement, preferably after selection by the user of a first content in a list of content displayed on the screen 13 (each content being associated to a sub-content, the list of content and each sub-content being displayable on the screen 13 of the mobile terminal 1), the steps of:
- display on the screen 13 a window containing the sub-content associated to a first content selected by a user from the list of contents;
- detect a predetermined touch gesture (preferably a second touch gesture such as a swipe down gesture) by the user on the screen;
- when a predetermined touch gesture has been detected, display on the screen 13, over the displayed window, a pop-up window containing a sub-list of contents from said list of contents.

The invention further proposes a computer program product, comprising code instructions for executing (in particular with a processing unit 11 of the terminal 1) the previously described method, as well as a computer-readable medium (in particular a memory 12 of the terminal 1), on which is stored a computer program product comprising code instructions for executing said method. In particular, this computer program product may correspond to the possibly dedicated software application discussed previously, and/or a general application providing list of contents.

The invention claimed is:

1. A method for handling on a mobile terminal a list of contents each associated to a respective sub-content, the list of contents and the sub-contents being displayable on a touch-sensitive screen of the mobile terminal, the method comprising:
   displaying on the screen said list of contents in response to a query;
   in response to a user selecting through the mobile terminal a first content of the list of contents, displaying on the screen a window containing the sub-content associated to the first content selected by the user;
   detecting a predetermined touch gesture by the user on the screen while displaying the window containing the sub-content associated to the first content; and
   in response to the predetermined touch gesture being detected:
      analyzing the first content to search for a contextual parameter associated with the first content,
      filtering said list of contents to produce a sub-list of contents from said list of contents that excludes the first content and using the contextual parameter to further filter said list of contents so that the sub-list of contents excludes at least one additional content of the list of contents as a function of said contextual parameter, and
      displaying on the screen, over the displayed window containing the sub-content associated to the first content, a pop-up window containing said sub-list of contents.

2. The method according to claim 1, further comprising:
   detecting a selection by the user of a second content from the displayed sub-list of contents; and
   replacing, in the displayed window, the sub-content associated with the first content with a sub-content associated with the selected second content.

3. The method according to claim 2, wherein the window comprises a layout and at least one container element adapted to contain the sub-content, and wherein, during the replacing, the layout is kept unmodified while the sub-content associated with the second content replaces the sub-content associated with the first content in the container element.

4. The method according to claim 1, wherein a graphic user interface is displayed on the screen, said graphic user interface comprising a back button for reverting to a previously displayed window when touched by the user according to a first touch gesture, the predetermined touch gesture being a second touch gesture, distinct from the first touch gesture, on said back button.

5. The method according to claim 1, wherein said predetermined touch gesture is a touch gesture among a swipe down touch gesture, a long duration touch gesture and a high force touch gesture.

6. The method according to claim 5, further comprising:
   detecting a selection by the user of a second content from the displayed sub-list of contents, which comprises selecting by releasing the touch of the screen; and
   replacing, in the displayed window, the sub-content associated with the first content with a sub-content associated with the selected second content.

7. The method according to claim 1, wherein said sub-list of contents excludes any content already selected.

8. The method according to claim 1, wherein the displaying the list of contents comprises displaying on the screen a window containing the list of contents for selection by the user previously to displaying the window containing the sub-content.

9. The method according to claim 1, further comprising:
detecting a touch release action on the screen after the predetermined touch gesture; and
if said touch release action occurs outside of the displayed pop-up window on the screen, closing the pop-up window.

10. A mobile terminal comprising:
a processing unit and a touch-sensitive screen, the processing unit being configured to:
display on the screen said list of contents in response to a query, each content associated to a respective sub-content;
in response to a user selecting through the mobile terminal a first content of the list of contents, display on the screen a window containing the sub-content associated to the first content selected by the user;
detect a predetermined touch gesture by the user on the screen while displaying the window containing the sub-content associated to the first content; and
in response to the predetermined touch gesture being detected:
analyze the first content to search for a contextual parameter associated with the first content,
filter said list of contents to produce a sub-list of contents from said list of contents that excludes the first content and using the contextual parameter to further filter said list of contents so that the sub-list of contents excludes at least one additional content of the list of contents as a function of said contextual parameter, and
display on the screen, over the displayed window containing the sub-content associated to the first content, a pop-up window containing said sub-list of contents.

11. A non-transitory computer-readable medium, on which is stored a computer program product comprising code instructions for executing a method for handling on a mobile terminal a list of contents each associated to a respective sub-content, when the instructions are executed by a processor of the mobile terminal, the list of contents and the sub-contents being displayable on a touch-sensitive screen of the mobile terminal, the method comprising:
displaying on the screen said list of contents in response to a query;
in response to a user selecting through the mobile terminal a first content of the list of contents, displaying on the screen a window containing the sub-content associated to the first content selected by the user;
detecting a predetermined touch gesture by the user on the screen while displaying the window containing the sub-content associated to the first content; and
in response to the predetermined touch gesture being detected:
analyzing the first content to search for a contextual parameter associated with the first content,
filtering said list of contents to produce a sub-list of contents from said list of contents that excludes the first content and using the contextual parameter to further filter said list of contents so that the sub-list of contents excludes at least one additional content of the list of contents as a function of said contextual parameter, and displaying on the screen, over the displayed window containing the sub-content associated to the first content, a pop-up window containing said sub-list of contents.

* * * * *